(12) United States Patent
Wu et al.

(10) Patent No.: US 7,427,462 B2
(45) Date of Patent: Sep. 23, 2008

(54) PHOTORECEPTOR LAYER HAVING RHODAMINE ADDITIVE

(75) Inventors: Jin Wu, Webster, NY (US); Daniel V. Levy, Rochester, NY (US); Liang-bih Lin, Rochester, NY (US); Linda L. Ferrarese, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 239 days.

(21) Appl. No.: 11/217,973

(22) Filed: Sep. 1, 2005

(65) Prior Publication Data

US 2007/0048640 A1    Mar. 1, 2007

(51) Int. Cl.
G03G 5/00    (2006.01)

(52) U.S. Cl. .......................... 430/131; 430/60
(58) Field of Classification Search .................. 430/65, 430/131
See application file for complete search history.

(56) References Cited

U.S. PATENT DOCUMENTS

| | | | |
|---|---|---|---|
| 4,026,704 A * | 5/1977 | Rochlitz et al. ............ 430/57.2 |
| 4,464,450 A | 8/1984 | Teuscher |
| 4,518,669 A | 5/1985 | Yashiki |
| 4,579,801 A | 4/1986 | Yashiki |
| 4,775,605 A | 10/1988 | Seki et al. |
| 5,017,449 A | 5/1991 | Yoshihara |
| 5,344,734 A | 9/1994 | Monbaliu et al. |
| 5,385,796 A | 1/1995 | Spiewak et al. |
| 5,449,573 A | 9/1995 | Aoki et al. |
| 5,489,496 A | 2/1996 | Katayama et al. |
| 5,641,599 A | 6/1997 | Markovics et al. |
| 5,656,407 A | 8/1997 | Kawahara |
| 5,658,702 A * | 8/1997 | Nukada ...................... 430/62 |
| 5,721,080 A | 2/1998 | Terrell et al. |
| 5,928,824 A | 7/1999 | Obinata et al. |
| 6,180,309 B1 | 1/2001 | Maty et al. |
| 6,200,716 B1 | 3/2001 | Fuller et al. |
| 6,207,334 B1 | 3/2001 | Dinh et al. |
| 6,255,027 B1 * | 7/2001 | Wehelie et al. ............... 430/65 |
| 2004/0043314 A1 * | 3/2004 | Jubran et al. ................. 430/75 |
| 2006/0057480 A1 * | 3/2006 | Lin et al. ..................... 430/65 |

OTHER PUBLICATIONS

U.S. Appl. No. 10/780,056, filed Feb. 17, 2004, Ioannidis et al.
U.S. Appl. No. 10/879,679, filed Jun. 29, 2004, Ioannidis et al.
U.S. Appl. No. 10/879,426, filed Jun. 29, 2004, Belknap et al.
U.S. Appl. No. 10/942,277, filed Sep. 16, 2004.

* cited by examiner

Primary Examiner—Mark F. Huff
Assistant Examiner—Peter L Vajda
(74) Attorney, Agent, or Firm—Pillsbury Winthrop Shaw Pittman LLP

(57) ABSTRACT

The presently disclosed embodiments relate in general to electrophotographic imaging members, such as layered photoreceptor structures, and processes for making and using the same. More particularly, the embodiments pertain to a photoreceptor that incorporates a rhodamine compound that improves image quality.

14 Claims, No Drawings

PHOTORECEPTOR LAYER HAVING RHODAMINE ADDITIVE

BACKGROUND

The invention relates generally to electrophotographic imaging members, such as layered photoreceptor structures, and processes for making and using the same. More particularly, the embodiments pertain to a photoreceptor that incorporates specific compounds to facilitate electron transport across the various interfaces of the photoreceptor device.

Electrophotographic imaging members, e.g., photoreceptors, typically include a photoconductive layer formed on an electrically conductive substrate. The photoconductive layer is an insulator in the substantial absence of light so that electric charges are retained on its surface. Upon exposure to light, the charge is dissipated.

In electrophotography, also known as Xerography, electrophotographic imaging or electrostatographic imaging, the surface of an electrophotographic plate, drum, belt or the like (imaging member or photoreceptor) containing a photoconductive insulating layer on a conductive layer is first uniformly electrostatically charged. The imaging member is then exposed to a pattern of activating electromagnetic radiation, such as light. The radiation selectively dissipates the charge on the illuminated areas of the photoconductive insulating layer while leaving behind an electrostatic latent image. This electrostatic latent image may then be developed to form a visible image by depositing oppositely charged particles on the surface of the photoconductive insulating layer. The resulting visible image may then be transferred from the imaging member directly or indirectly (such as by a transfer or other member) to a print substrate, such as transparency or paper. The imaging process may be repeated many times with reusable imaging members.

An electrophotographic imaging member may be provided in a number of forms. For example, the imaging member may be a homogeneous layer of a single material such as vitreous selenium or it may be a composite layer containing a photoconductor and another material. In addition, the imaging member may be layered. These layers can be in any order, and sometimes can be combined in a single or mixed layer.

The demand for improved print quality in xerographic reproduction is increasing, especially with the advent of color. Common print quality issues are strongly dependent on the quality of the undercoat layer. Conventional materials used for the undercoat or blocking layer have been problematic. In certain situations, a thicker undercoat is desirable, but the thickness of the material used for the undercoat layer is limited by the inefficient transport of the photo-injected electrons from the generator layer to the substrate. If the undercoat layer is too thin, then incomplete coverage of the substrate results due to wetting problems on localized unclean substrate surface areas. The incomplete coverage produces pin holes which can, in turn, produce print defects such as charge deficient spots ("CDS") and bias charge roll ("BCR") leakage breakdown. Other problems include "ghosting," which is thought to result from the accumulation of charge somewhere in the photoreceptor. Consequently, when a sequential image is printed, the accumulated charge results in image density changes in the current printed image that reveals the previously printed image. Thus, there is a need, which the present invention addresses, for a way to minimize or eliminate charge accumulation in photoreceptors, without sacrificing the desired thickness of the undercoat layer.

The terms "charge blocking layer" and "blocking layer" are generally used interchangeably with the phrase "undercoat layer."

Conventional photoreceptors and their materials are disclosed in Katayama et al., U.S. Pat. No. 5,489,496; Yashiki, U.S. Pat. No. 4,579,801; Yashiki, U.S. Pat. No. 4,518,669; Seki et al., U.S. Pat. No. 4,775,605; Kawahara, U.S. Pat. No. 5,656,407; Markovics et al., U.S. Pat. No. 5,641,599; Monbaliu et al., U.S. Pat. No. 5,344,734; Terrell et al., U.S. Pat. No. 5,721,080; and Yoshihara, U.S. Pat. No. 5,017,449, which are herein incorporated by reference.

More recent photoreceptors are disclosed in Fuller et al., U.S. Pat. No. 6,200,716; Maty et al., U.S. Pat. No. 6,180,309; and Dinh et al., U.S. Pat. No. 6,207,334, which are herein incorporate by reference.

Other recent photoreceptors are disclosed in commonly assigned Ioannidis et al., U.S. patent application Ser. No. 10/780,056, filed on Feb. 17, 2004; commonly assigned Ioannidis et al., U.S. patent application Ser. No. 10/879,679, filed on Jun. 29, 2004; and commonly assigned Belknap et al., U.S. patent application Ser. No. 10/879,426, filed on Jun. 29, 2004, which are herein incorporated by reference.

Conventional undercoat layers are also disclosed in U.S. Pat. No. 4,464,450; U.S. Pat. No. 5,449,573; U.S. Pat. No. 5,385,796; and Obinata et al, U.S. Pat. No. 5,928,824, which are herein incorporated by reference.

SUMMARY

According to embodiments illustrated herein, there is provided a way in which print quality is improved, for example, ghosting is minimized or substantially eliminated in images printed in systems with high transfer current.

In particular, an embodiment of the present invention provides an electrophotographic imaging member, comprising a substrate, an undercoat layer formed on the substrate, wherein the undercoat layer includes a rhodamine compound, and at least one imaging layer formed on the undercoat layer.

Embodiments of the present invention also provide processes with which to prepare such an imaging member, comprising forming a coating mixture by blending a rhodamine compound into a dispersion containing a metal oxide, applying the coating mixture on an electrophotographic imaging member, and causing the coating mixture to form an undercoat layer on the electrophotographic imaging member.

In another embodiment, there is described a process for preparing an electrophotographic imaging member, comprising forming a coating mixture by dispersing a rhodamine compound with a formulation containing a metal oxide, applying the coating mixture on an electrophotographic imaging member, and causing the coating mixture to form an undercoat layer on the electrophotographic imaging member.

DETAILED DESCRIPTION

In the following description, reference is made to the accompanying drawings, which form a part hereof and which illustrate several embodiments of the present invention. It is understood that other embodiments may be utilized and structural and operational changes may be made without departure from the scope of the present invention.

Embodiments of the present invention relate to a photoreceptor having a undercoat layer which incorporates an additive to the formulation that helps reduce, and preferably substantially eliminates, specific printing defects in the print images.

According to embodiments of the present invention, an electrophotographic imaging member is provided, which generally comprises at least a substrate layer, an undercoat layer, and an imaging layer. The undercoating layer is generally located between the substrate and the imaging layer, although additional layers may be present and located between these layers. The imaging member may also include a charge generating layer and a charge transport layer. This imaging member can be employed in the imaging process of electrophotography, where the surface of an electrophotographic plate, drum, belt or the like (imaging member or photoreceptor) containing a photoconductive insulating layer on a conductive layer is first uniformly electro statically charged. The imaging member is then exposed to a pattern of activating electromagnetic radiation, such as light. The radiation selectively dissipates the charge on the illuminated areas of the photoconductive insulating layer while leaving behind an electrostatic latent image. This electrostatic latent image may then be developed to form a visible image by depositing oppositely charged particles on the surface of the photoconductive insulating layer. The resulting visible image may then be transferred from the imaging member directly or indirectly (such as by a transfer or other member) to a print substrate, such as transparency or paper. The imaging process may be repeated many times with reusable imaging members.

Thick undercoat layers are desirable for photoreceptors due to their life extension and carbon fiber resistance. Furthermore, thicker undercoat layers make it possible to use less costly substrates in the photoreceptors. Such thick undercoat layers have been developed, such as one developed by Xerox Corporation and disclosed in U.S. patent application Ser. No. 10/942,277, filed Sep. 16, 2004, entitled "Photoconductive Imaging Members," which is hereby incorporated by reference. However, due to insufficient electron conductivity in dry and cold environments, the residual potential in conditions known as "J zone" (10% room humidity and 70° F.) is unacceptably high (e.g., >150V) when the undercoat layer is thicker than 15 μm.

Common print quality issues are strongly dependent on the quality of the undercoat layer. Conventional materials used for the undercoat or blocking layer have been problematic because print quality issues are strongly dependent on the quality of the undercoat layer. For example, charge deficient spots ("CDS") and bias charge roll ("BCR") leakage breakdown are problems the commonly occur. Another problem is "ghosting," which is thought to result from the accumulation of charge somewhere in the photoreceptor. Consequently, when a sequential image is printed, the accumulated charge results in image density changes in the current printed image that reveals the previously printed image.

There have been formulations developed for undercoat layers that, while suitable for their intended purpose, do not address the ghosting effect problem. To alleviate the problems associated with charge block layer thickness and high transfer currents, the addition of charge transfer molecules to undercoat formulations is performed to produce a charge transfer complex that helps reduce and preferably substantially eliminate ghosting failure in xerographic reproductions. One such charge transfer molecule is disclosed in commonly assigned U.S. patent application entitled "PHOTORECEPTOR ADDITIVE," application Ser. No. 11/213,522, on Aug. 26, 2005, which is herein incorporated by reference. According to embodiments of the present invention, the addition of rhodamine compound to a formulation containing a metal oxide, such as $TiO_2$, is demonstrated to greatly reduce ghosting levels in xerographic reproductions.

Typical chemical compounds of rhodamine that can be used with embodiments of the present invention include, but are not limited to, (1) $C_{21}H_{17}ClN_2O_3$ (also known as, Rhodamine 123), (2) $C_{28}H_{31}ClN_2O_3$ (also known as, Rhodamine B), (3) $C_{28}H_{30}N_2O_3$ (also known as, Rhodamine B base), (4) $C_{36}H_{34}FN_3O_8S$ (also known as, Rhodamine B 5-[3(4)-(aminocarbonyl)-4(3)-carboxybenzenesulfonyl fluoride]), (5) $C_{28}H_{31}N_3O_3$ (also known as, Rhodamine B amine), (6) $C_{28}H_{32}N_4O_2$ (also known as, Rhodamine B hydrazide), (7) $C_{29}H_{30}ClN_3O_3S$ (also known as, Rhodamine B thiocyanate), (8) $C_{46}H_{67}ClN_2O_7$ (also known as, Rhodamine B octadecyl ester perchlorate), (9) $C_{38}H_{37}ClN_2O_5$ (also known as, Mito Red, Rhodamine B 4-methylumbelliferyl ester chloride), (10) $C_{28}H_{31}N_2O_3Cl$ (also known as, Rhodamine 6G), (11) $C_{28}H_{30}N_2O_3 \cdot HBF_4$ (also known as, Rhodamine 6G tetrafluoroborate), (12) $C_{28}H_{30}N_2O_3 \cdot HClO_4$ (also known as, Rhodamine 6G perchlorate), (13) $C_{20}OH_{15}ClN_2O_3$ (also known as, Rhodamine 110), (14) $C_{22}H_{18}N_2O_3 \cdot HClO_4$ (also known as, Rhodamine 116 perchlorate), (15) $C_{33}H_{30}N_2O_5$ (also known as, 5(6)-carboxy-X-Rhodamine), (16) $C_{37}H_{33}N_3O_7$ (also known as, 5(6)-carboxy-X-Rhodamine N-succinimidyl ester), (17) $C_{26}H_{26}N_2O_3 \cdot HClO_4$ (also known as, Rhodamine 19 perchlorate, Rhodamine 575), (18) $C_{33}H_{30}N_2O_5C_6H_{15}N$ (also known as, 5-carboxy-X-Rhodamine triethylamine salt), (19) $C_{32}H_{30}N_2O_3$ (also known as, Rhodamine 101), (20) $C_{26}H_{26}ClN_3O$ (also known as, Rhodamine 800), (21) $C_{20}H_{16}N_2O_7S$ (also known as, Rhodamine sulfate), (22) $C_{27}H_{29}ClN_2O_6S_2$ (also known as, Sulforhodamine B acid chloride), (23) $C_{48}H_{48}ClN_5O_3$ (also known as, Rhodanile Blue), (24) $C_{29}H_{25}N_3O_7$ (also known as, 5(6)-carboxytetramethyl Rhodamine N-succinimidyl ester), (25) $C_{39}H_{50}N_2O_5S$ (also known as, N'-octadecylfluorescein-5-thiourea), (26) $C_{60}H_{93}N_3NaO_{14}PS_2$ (also known as, phosphatidylethanolamine, dimyristoyl-Sulforhodamine B), and (27) $C_{28}H_{32}N_4O_3$ (also known as, DAR-1,4,5-diamino-Rhodamine B), and the like and mixtures thereof. The chemical structures are shown below:

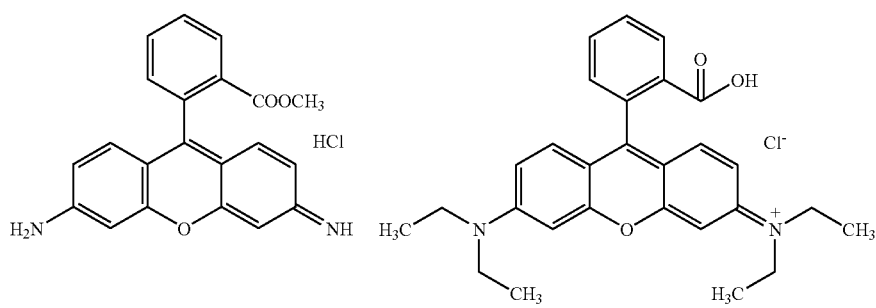

-continued
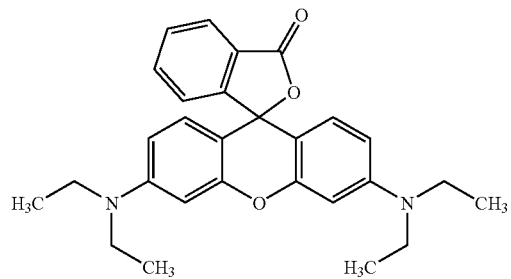
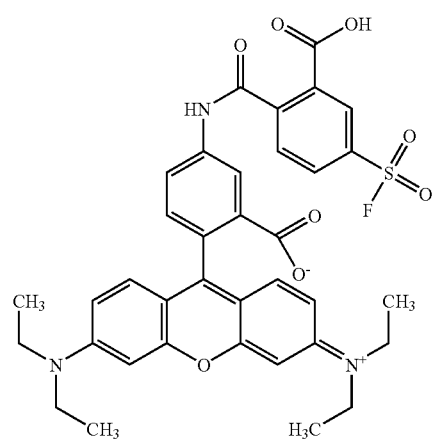
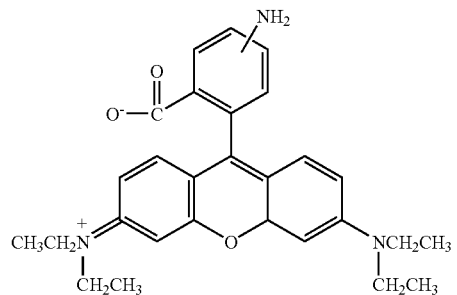
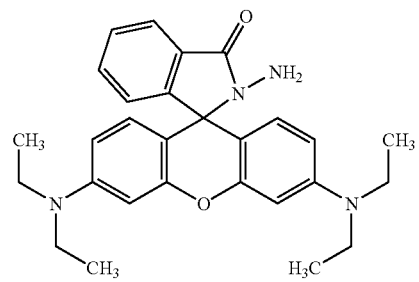
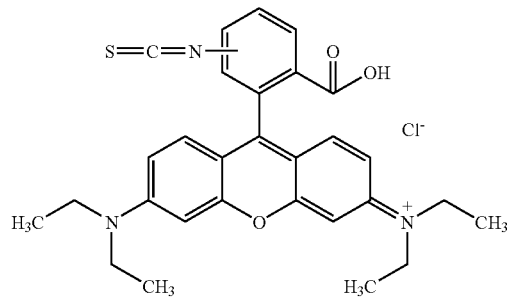
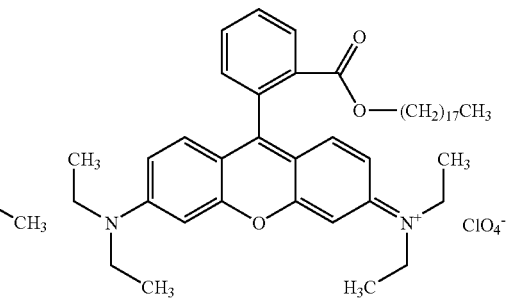
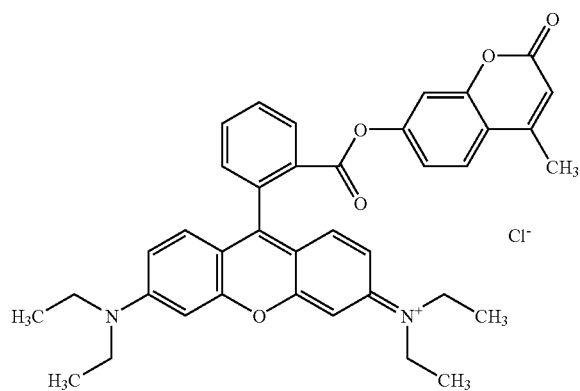
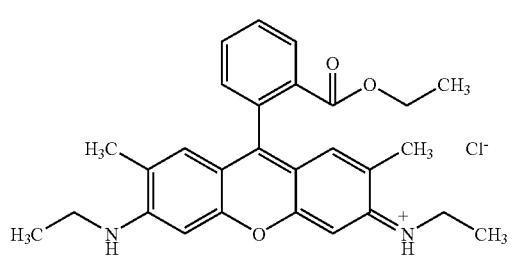

-continued
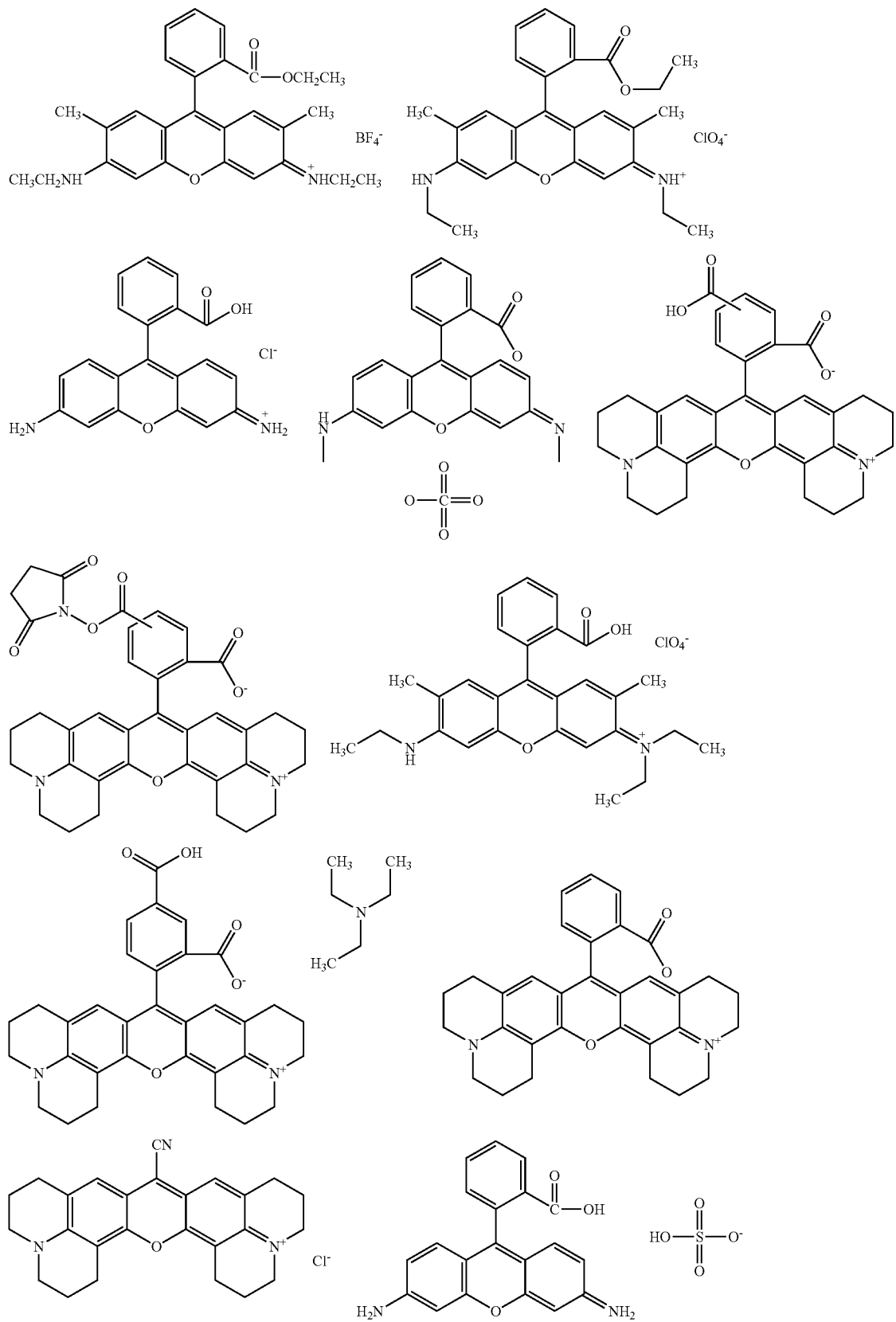

-continued

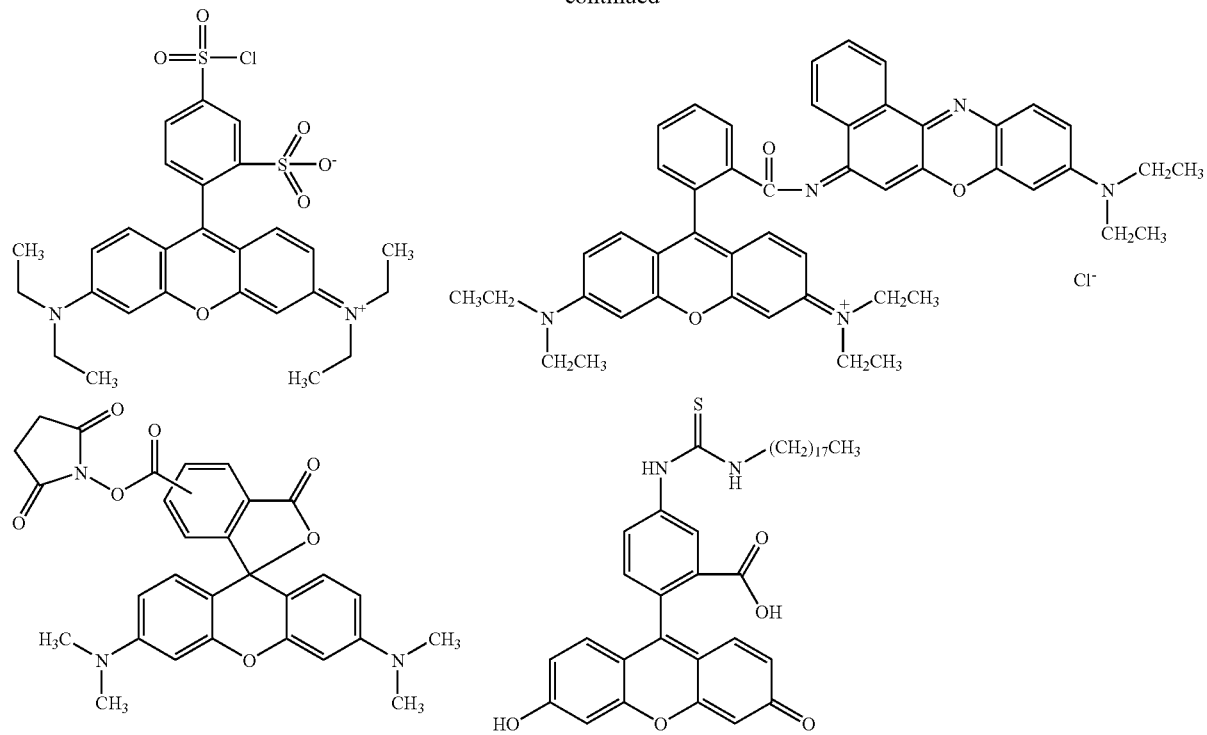

Other counter ions, including fluoride, chloride, iodide, bromide, tetrafluoroborate, perchlorate, sulfate and triethylamine may be used in place of each other.

In embodiments, the metal oxide can be selected from, for example, the group consisting of ZnO, $SnO_2$, $TiO_2$, $Al_2O_3$, $SiO_2$, $ZrO_2$, $In_2O_3$, $MoO_3$, and a mixture thereof. In various embodiments, the metal oxide can be $TiO_2$. In various embodiments, $TiO_2$ can be either surface treated or untreated. Surface treatments include, but are not limited to aluminum laurate, alumina, zirconia, silica, silane, methicone, dimethicone, sodium metaphosphate, and the like and mixtures thereof. Examples of $TiO_2$ include MT-150W (surface treatment with sodium metaphosphate, Tayca Corporation), STR-60N (no surface treatment, Sakai Chemical Industry Co., Ltd.), FTL-100 (no surface treatment, Ishihara Sangyo Laisha, Ltd.), STR-60 (surface treatment with Al2O3, Sakai Chemical Industry Co., Ltd.), TTO-55N (no surface treatment, Ishihara Sangyo Laisha, Ltd.), TTO-55A (surface treatment with Al2O3, Ishihara Sangyo Laisha, Ltd.), MT-150AW (no surface treatment, Tayca Corporation), MT-150A (no surface treatment, Tayca Corporation), MT-100S (surface treatment with aluminum laurate and alumina, Tayca Corporation), MT-100HD (surface treatment with zirconia and alumina, Tayca Corporation), MT-100SA (surface treatment with silica and alumina, Tayca Corporation), and the like.

Undercoat layer binder materials are well known in the art. Typical undercoat layer binder materials include, for example, polyesters, MOR-ESTER 49,000 from Morton International Inc., VITEL PE-100, VITEL PE-200, VITEL PE-200D, and VITEL PE-222 from Goodyear Tire and Rubber Co., polyarylates such as ARDEL from AMOCO Production Products, polysulfone from AMOCO Production Products, polyurethanes, and the like. Other examples of suitable undercoat layer binder materials include, but are not limited to, a polyamide such as Luckamide 5003 from DAINIPPON Ink and Chemicals, Nylon 8 with methylmethoxy pendant groups, CM 4000 and CM 8000 from Toray Industries Ltd and other N-methoxymethylated polyamides, such as those prepared according to the method described in Sorenson and Campbell "Preparative Methods of Polymer Chemistry" second edition, p. 76, John Wiley and Sons Inc. (1968), and the like and mixtures thereof. These polyamides can be alcohol soluble, for example, with polar functional groups, such as methoxy, ethoxy and hydroxy groups, pendant from the polymer backbone. Another examples of undercoat layer binder materials include phenolic-formaldehyde resin such as VARCUM 29159 from OXYCHEM, aminoplast-formaldehyde resin such as CYMEL resins from CYTEC, poly (vinyl butyral) such as BM-1 from Sekisui Chemical, and the like and mixtures thereof.

The weight/weight ratio of the rhodamine compound and the metal oxide is from about 0.0001/1 to about 0.5/1, or from about 0.001/1 to about 0.1/1, or from about 0.01/1 to about 0.05/1. The weight/weight ratio of the rhodamine compound in the undercoat layer formulation is from about 0.0001/1 to about 0.3/1, or from about 0.001/1 to about 0.05/1, or from about 0.01/1 to about 0.03/1.

The undercoat layer may consist of one, one or more, or a mixture thereof, of the above rhodamine compound structures and a polymeric binder. In one embodiment, the binder is hydrophilic melamine-formaldehyde resin. The weight/weight ratio of the rhodamine compound and the binder is from about 0.001/1 to about 0.1/1, or from about 0.01/1 to about 0.03/1.

In various embodiments, the undercoat layer further contains an optional light scattering particle. In various embodiments, the light scattering particle has a refractive index different from the binder and has a number average particle size greater than about 0.8 μm. The light scattering particle can be amorphous silica or silicone ball. In various embodiments, the light scattering particle can be present in an amount of from about 0% to about 10% by weight of the total weight of the undercoat layer.

In various embodiments, the undercoat layer has a thickness of from about 0.1 μm to about 30 μm, or from about 2 μm to about 25 μm, or from about 10 μm to about 20 μm.

In various embodiments, the charge transfer molecule is Rhodamine 123. The rhodamine compound is physically impregnated into the undercoat layer formulation by physically mixing it into the dispersed formulation. Some methods that can be used to incorporate an additive into a formulation to form an undercoat layer include the following: (1) simple mixing of a rhodamine compound, with a dispersion of $TiO_2$ MT-150W, phenolic resin VARCUM 29159, melamine resin CYMEL 323 in xylene, 1-butanol, and methyl ethyl ketone (MEK) with the dispersion being prepared beforehand via ball milling; and (2) ball milling a rhodamine compound with the formulation of $TiO_2$ MT-150W, phenolic resin VARCUM 29159, melamine resin CYMEL 323 in xylene, 1-butanol, and MEK. The $TiO_2$ may have a powder volume resistivity of from about $1 \times 10^4$ to about $1 \times 10^{10}$ Ωcm under a 100 kg/cm² loading pressure at 50% humidity and at room temperature.

The undercoat layer may be applied or coated onto a substrate by any suitable technique known in the art, such as spraying, dip coating, draw bar coating, gravure coating, silk screening, air knife coating, reverse roll coating, vacuum deposition, chemical treatment and the like. Additional vacuuming, heating, drying and the like, may be used to remove any solvent remaining after the application or coating to form the undercoat layer.

All the patents and applications referred to herein are hereby specifically, and totally incorporated herein by reference in their entirety in the instant specification.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

EXAMPLES

The examples set forth herein below and are illustrative of different compositions and conditions that can be used in practicing the invention. All proportions are by weight unless otherwise indicated. It will be apparent, however, that the invention can be practiced with many types of compositions and can have many different uses in accordance with the disclosure above and as pointed out hereinafter.

Example I

An undercoat layer ("TUC8") dispersion was prepared as follows: a titanium oxide/phenolic resin/melamine resin dispersion was prepared by ball milling 15 grams of titanium dioxide (MT-150W, Tayca Company), 10 grams of the phenolic resin (VARCUM 29159, OxyChem Company, $M_w$ of about 3,600, viscosity of about 200 cps) and 6.25 grams of the melamine resin (CYMEL 323, CYTEC) in 7.5 grams of 1-butanol, and 7.5 grams of xylene with 120 grams of 1 millimeter diameter sized $ZrO_2$ beads for 5 days. The resulting titanium dioxide dispersion was filtered with a 20 micrometer pore size nylon cloth, and then the filtrate was measured with HORIBA CAPA 700 Particle Size Analyzer, and there was obtained a median $TiO_2$ particle size of 50 nanometers in diameter and a $TiO_2$ particle surface area of 30 m²/gram with reference to the above $TiO_2$/VARCUM/CYMEL dispersion. 0.5 grams of methyl ethyl ketone and 0.1 grams of the acid catalyst (CY-CAT 4040, CYTEC) were added into the dispersion to obtain the coating dispersion. An aluminum drum, cleaned with detergent and rinsed with deionized water, was then coated with the above generated coating dispersion, and subsequently dried at 160° C. for 15 minutes, which resulted in the TUC8 layer deposited on the aluminum and comprised of $TiO_2$/VARCUM/CYMEL with a weight ratio of about 60/20/20 and a thickness of 4 microns.

Example II

To the above undercoat dispersion in Example I, was added 0.15 gram of Rhodamine 123 with the following chemical structure of:

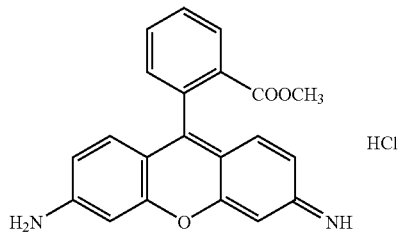

An aluminum drum, cleaned with detergent and rinsed with deionized water, was then coated with the above generated coating dispersion, and subsequently, dried at 160° C. for 15 minutes, which resulted in an undercoat layer deposited on the aluminum and comprised of Rhodamine/$TiO_2$/VARCUM/CYMEL with a weight ratio of about 0.6/60/20/20 and a thickness of 4 microns.

Example III

To the above undercoat dispersion in Example I, was added 0.15 gram of Rhodamine B base with the following chemical structure of:

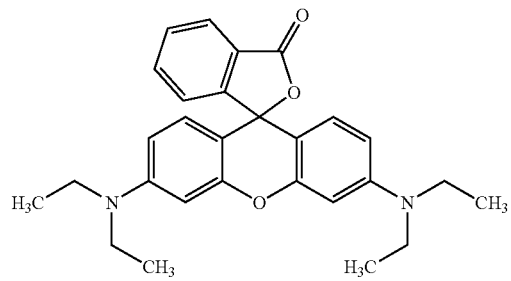

An aluminum drum, cleaned with detergent and rinsed with deionized water, was then coated with the above generated coating dispersion, and subsequently, dried at 160° C. for 15 minutes, which resulted in an undercoat layer deposited on the aluminum and comprised of Rhodamine/$TiO_2$/VARCUM/CYMEL with a weight ratio of about 0.6/60/20/20 and a thickness of 4 microns.

Example IV

To the above undercoat dispersion in Example I, was added 0.15 gram of Rhodamine 6G base with the following chemical structure of:

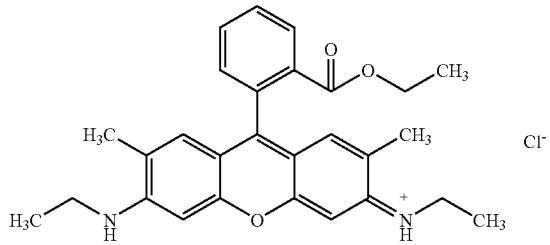

An aluminum drum, cleaned with detergent and rinsed with deionized water, was then coated with the above generated coating dispersion, and subsequently, dried at 160° C. for 15 minutes, which resulted in an undercoat layer deposited on the aluminum and comprised of Rhodamine/TiO$_2$/VARCUM/CYMEL with a weight ratio of about 0.6/60/20/20 and a thickness of 4 microns.

Example V

To the above undercoat dispersion in Example I, was added 0.15 gram of Rhodamine 110 base with the following chemical structure of:

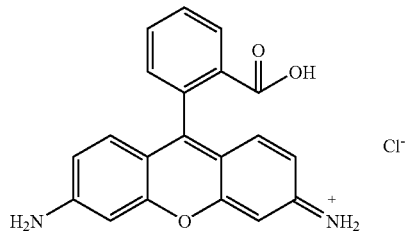

An aluminum drum, cleaned with detergent and rinsed with deionized water, was then coated with the above generated coating dispersion, and subsequently, dried at 160° C. for 15 minutes, which resulted in an undercoat layer deposited on the aluminum and comprised of Rhodamine/TiO$_2$/VARCUM/CYMEL with a weight ratio of about 0.6/60/20/20 and a thickness of 4 microns.

Example VI

To the above undercoat dispersion in Example I, was added 0.15 gram of Rhodamine 575 base with the following chemical structure of:

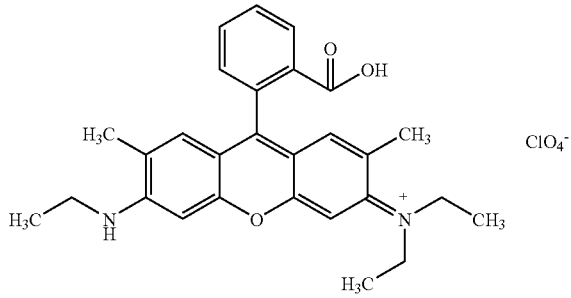

An aluminum drum, cleaned with detergent and rinsed with deionized water, was then coated with the above generated coating dispersion, and subsequently, dried at 160° C. for 15 minutes, which resulted in an undercoat layer deposited on the aluminum and comprised of Rhodamine/TiO$_2$/VARCUM/CYMEL with a weight ratio of about 0.6/60/20/20 and a thickness of 4 microns.

Example VII

To the above undercoat dispersion in Example I, was added 0.15 gram of Rhodamine 101 base with the following chemical structure of:

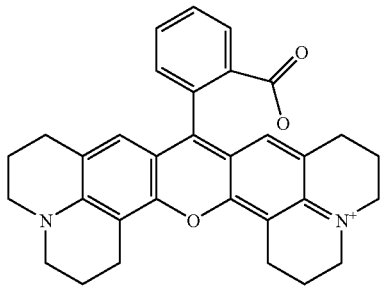

An aluminum drum, cleaned with detergent and rinsed with deionized water, was then coated with the above generated coating dispersion, and subsequently, dried at 160° C. for 15 minutes, which resulted in an undercoat layer deposited on the aluminum and comprised of Rhodamine/TiO$_2$/VARCUM/CYMEL with a weight ratio of about 0.6/60/20/20 and a thickness of 4 microns.

Example VIII

To the above undercoat dispersion in Example I, was added 0.15 gram of Rhodamine 800 base with the following chemical structure of:

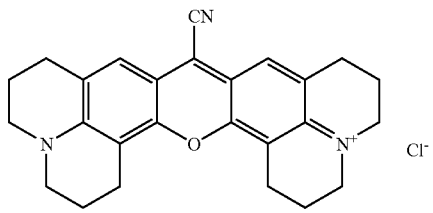

An aluminum drum, cleaned with detergent and rinsed with deionized water, was then coated with the above generated coating dispersion, and subsequently, dried at 160° C. for 15 minutes, which resulted in an undercoat layer deposited on the aluminum and comprised of Rhodamine/TiO$_2$/VARCUM/CYMEL with a weight ratio of about 0.6/60/20/20 and a thickness of 4 microns.

A chlorogallium phthalocyanine (ClGaPc) photogeneration layer dispersion was prepared as follows: 2.7 grams of ClGaPc Type B pigment was mixed with about 2.3 grams of polymeric binder VMCH (Dow Chemical) and 45 grams of n-butyl acetate. The mixture was milled in an ATTRITOR mill with about 200 grams of 1 mm Hi-Bea borosilicate glass beads for about 3 hours. The dispersion was filtered through a 20-μm nylon cloth filter, and the solid content of the dispersion was diluted to about 5 weight percent with n-butyl acetate. The ClGaPc photogeneration layer dispersion was applied on top of the above undercoat layers, respectively. The thickness of the photogeneration layer was approximately 0.2 μm. Subsequently, a 29 μm charge transport layer was coated on top of the photogeneration layer from a dispersion prepared from N,N'-diphenyl-N,N-bis(3-methylphenyl)-1,1'-biphenyl-4,4'-diamine (5.38 grams), a film forming polymer binder PCZ 400 [poly(4,4'-dihydroxy-diphenyl-1-1-cyclohexane, Mw=40,000)] available from Mitsubishi Gas Chemical Company, Ltd. (7.13 grams), and PTFE POLYFLON L-2 microparticle (1 gram) available from Daikin Industries dissolved/dispersed in a solvent mixture of 20 grams of tetrahydrofuran (THF) and 6.7 grams of toluene via CAVIPRO 300 nanomizer (Five Star technology, Cleveland, Ohio). The charge transport layer was dried at about 120° C. for about 40 minutes.

The above prepared photoreceptor devices were tested in a scanner set to obtain photo induced discharge curves, sequenced at one charge-erase cycle followed by one charge-expose-erase cycle, wherein the light intensity was incrementally increased with cycling to produce a series of photo induced discharge characteristic curves (PIDC) from which the photosensitivity and surface potentials at various exposure intensities were measured. Additional electrical characteristics were obtained by a series of charge-erase cycles with incrementing surface potential to generate several voltages versus charge density curves. The scanner was equipped with a scorotron set to a constant voltage charging at various surface potentials. The devices were tested at surface potentials of about 500 and about 700 volts with the exposure light intensity incrementally increased by means of regulating a series of neutral density filters. The exposure light source was a 780-nanometer light emitting diode. The aluminum drum was rotated at a speed of about 61 revolutions per minute to produce a surface speed of about 122 millimeters per second. The xerographic simulation was completed in an environmentally controlled light tight chamber at ambient conditions (about 50 percent relative humidity and about 22° C.).

Very similar photo-induced discharge curves (PIDC) were observed for all the photoreceptor devices, thus the incorporation of the Rhodamine compound does not adversely affect PIDC.

The above photoreceptor devices were then acclimated for 24 hours before testing in J-zone (70° F./10% Room Humidity). Print tests were performed in Copeland Work centre Pro 3545 using black and white copy mode to achieve machine speed of 208 mm. After printing 200 5% area coverage documents, ghosting levels were measured against an empirical scale, where the smaller the ghosting grade level, the better the print quality. In general, a ghosting grade reduction of 1 to 2 levels was observed when the Rhodamine compound was incorporated in undercoat layer. Therefore, incorporation of the Rhodamine compound in undercoat layer significantly improves print quality such as ghosting.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are, therefore, to be considered in all respects as illustrative and not restrictive, the scope of the invention being indicated by the appended claims rather than the foregoing description. All changes that come within the meaning of and range of equivalency of the claims are intended to be embraced therein.

What is claimed is:

1. A process for preparing an electrophotographic imaging member, comprising:
    forming a coating mixture by blending a rhodamine compound into a dispersion containing a metal oxide, a resin binder and a light scattering particle, wherein the rhodamine compound has a C=N bond that facilitates formation of a charge transfer complex with the metal oxide to form the charge transfer complex, and the light scattering particle has a refractive index different from the resin binder;
    applying the coating mixture on an electrophotographic imaging member; and
    causing the coating mixture to form an undercoat layer on the electrophotographic imaging member.

2. The process of claim 1, wherein the rhodamine compound is selected from the group consisting of:
$C_{21}H_{17}ClN_2O_3$, $C_{28}H_{31}ClN_2O_3$, $C_{36}H_{34}FN_3O_8S$, $C_{29}H_{30}ClN_3O_3S$, $C_{46}H_{67}ClN_2O_7$, $C_{38}H_{37}ClN_2O_5$, $C_{28}H_{31}N_2O_3Cl$, $C_{28}H_{30}N_2O_3$ $HBF_4$, $C_{28}H_{30}N_2O_3$ $HClO_4$, $C_{20}H_{15}ClN_2O_3$, $C_{22}H_{18}N_2O_3$ $HClO_4$, $C_{33}H_{30}N_2O_5$, $C_{37}H_{33}N_3O_7$, $C_{26}H_{26}N_2O_3$ $HClO_4$, $C_{33}H_{30}N_2O_5$ $C_6H_{15}N$, $C_{32}H_{30}N_2O_3$, $C_{26}H_{26}ClN_3O$, $C_{20}H_{16}N_2O_7S$, $C_{27}H_{29}ClN_2O_6S_2$, $C_{48}H_{48}ClN_5O_3$, $C_{60}H_{93}N_3NaO_{14}PS_2$, AND $C_{28}H_{32}N_4O_3$, and mixtures thereof.

3. The process of claim 1, wherein the metal oxide has a median particle size of 50 nanometers in diameter and a particle surface area of 30 $m^2$/gram and is selected from the group consisting of $ZnO$, $SnO_2$, $TiO_2$, $Al_2O_3$, $SiO_2$, $ZrO_2$, $In_2O_3$, $MoO_3$, and mixtures thereof.

4. The process of claim 3, wherein the $TiO_2$ has a powder volume resistivity of from about $1 \times 10^4$ to about $1 \times 10^{10}$ Ωcm under a 100 kg/$cm^2$ loading pressure at 50% humidity and at room temperature.

5. The process of claim 1, wherein the rhodamine compound is present in an amount of about 0.01% to about 30% by weight of the total weight of the complex.

6. The process of claim 1, wherein the thickness of the undercoat layer is from about 0.1 μm to about 30 μm.

7. A process for preparing an electrophotographic imaging member, comprising:
    forming a coating mixture by dispersing a rhodamine compound with a formulation containing a metal oxide, a resin binder and a light scattering particle, wherein the rhodamine compound has a C=N bond that facilitates formation of a charge transfer complex with the metal oxide to form the charge transfer complex, and the light scattering particle has a refractive index different from the resin binder;
    applying the coating mixture on an electrophotographic imaging member; and
    causing the coating mixture to form an undercoat layer on the electrophotographic imaging member.

8. The process of claim 7, wherein the rhodamine compound is selected from the group consisting of:
$C_{21}H_{17}ClN_2O_3$, $C_{28}H_{31}ClN_2O_3$, $C_{36}H_{34}FN_3O_8S$, $C_{29}H_{30}ClN_3O_3S$, $C_{46}H_{67}ClN_2O_7$, $C_{38}H_{37}ClN_2O_5$, $C_{28}H_{31}N_2O_3Cl$, $C_{28}H_{30}N_2O_3$ $HBF_4$, $C_{28}H_{30}N_2O_3$ $HClO_4$, $C_{20}H_{15}ClN_2O_3$, $C_{22}H_{18}N_2O_3$ $HClO_4$, $C_{33}H_{30}N_2O_5$, $C_{37}H_{33}N_3O_7$, $C_{26}H_{26}N_2O_3$ $HClO_4$, $C_{33}H_{30}N_2O_5$ $C_6H_{15}N$, $C_{32}H_{30}N_2O_3$, $C_{26}H_{26}ClN_3O$, $C_{20}H_{16}N_2O_7S$, $C_{27}H_{29}ClN_2O_6S_2$, $C_{48}H_{48}ClN_5O_3$, $C_{60}H_{93}N_3NaO_{14}PS_2$, AND $C_{28}H_{32}N_4O_3$, and mixtures thereof.

9. The process of claim 7, wherein the metal oxide has a median particle size of 50 nanometers in diameter and a particle surface area of 30 $m^2$/gram and is selected from the group consisting of $ZnO$, $SnO_2$, $TiO_2$, $Al_2O_3$, $SiO_2$, $ZrO_2$, $In_2O_3$, $MoO_3$, and mixtures thereof.

10. The process of claim 9, wherein the $TiO_2$ has a powder volume resistivity of from about $1\times10^4$ to about $1\times10^{10}$ $\Omega$cm under a 100 kg/cm$_2$, loading pressure at 50% humidity and at room temperature.

11. The process of claim 7, wherein the rhodamine compound is present in an amount of about 0.01% to about 30% by weight of the total weight of the complex.

12. The process of claim 7, wherein the thickness of the undercoat layer is from about 0.1 µm to about 30 µm.

13. A process for preparing an electrophotographic imaging member, comprising:

forming a coating mixture by blending a rhodamine compound into a dispersion containing a metal oxide, wherein the rhodamine compound has a C=N bond that facilitates formation of a charge transfer complex with the metal oxide to form the charge transfer complex and a weight/weight ratio of the rhodamine compound and the metal oxide is from about 0.0001/1 to about 0.5/1;

applying the coating mixture on an electrophotographic imaging member; and causing the coating mixture to form an undercoat layer on the electrophotographic imaging member.

14. A process for preparing an electrophotographic imaging member, comprising:

forming a coating mixture by dispersing a rhodamine compound with a formulation containing a metal oxide, wherein the rhodamine compound has a C=N bond that facilitates formation of a charge transfer complex with the metal oxide to form the charge transfer complex and a weight/weight ratio of the rhodamine compound and the metal oxide is from about 0.0001/1 to about 0.5/1;

applying the coating mixture on an electrophotographic imaging member; and causing the coating mixture to form an undercoat layer on the electrophotographic imaging member.

* * * * *